(12) United States Patent
McMackin et al.

(10) Patent No.: US 6,432,287 B1
(45) Date of Patent: Aug. 13, 2002

(54) EXHAUST GAS TEMPERATURE SENSING ON THE OUTSIDE SURFACE OF THE OXYGEN SENSOR

(75) Inventors: Mark E. McMackin, Royal Oak; Rama Madugula, Troy; Patrick T McCourt, Auburn Hills; Anthony R Mrosewske, Troy, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/516,814

(22) Filed: Mar. 1, 2000

(51) Int. Cl.7 .......................... F01N 11/00; G01K 13/00
(52) U.S. Cl. .................. 204/424; 73/23.31; 60/276; 123/697; 374/142; 374/144; 374/164
(58) Field of Search .................. 374/141, 142, 374/144, 148, 164; 204/424–429; 60/272, 276, 277, 300; 123/697; 73/23.31, 23.32, 31.05

(56) References Cited

U.S. PATENT DOCUMENTS

| | | | |
|---|---|---|---|
| 4,376,026 A | * | 3/1983 | Hoffman et al. |
| 4,510,036 A | * | 4/1985 | Takeuchi et al. |
| 4,595,485 A | * | 6/1986 | Takahashi et al. |
| 4,980,042 A | * | 12/1990 | Shiomi et al. |
| 5,106,203 A | | 4/1992 | Napoli et al. |
| 5,148,795 A | | 9/1992 | Nagai et al. |
| 5,219,228 A | | 6/1993 | Ker et al. |
| 5,740,675 A | | 4/1998 | Shimasaki et al. |
| 5,815,828 A | | 9/1998 | Nankee, II et al. |
| 5,970,968 A | | 10/1999 | Davis |
| 6,006,153 A | | 12/1999 | Stander et al. |
| 6,085,575 A | * | 7/2000 | Wienaud et al. ........... 73/23.32 |
| 6,360,581 B1 | * | 3/2002 | Murase et al. ............. 73/23.31 |

* cited by examiner

*Primary Examiner*—Joseph W. Drodge
(74) *Attorney, Agent, or Firm*—Edwin W. Bacon, Jr.

(57) ABSTRACT

A device provided in an exhaust system of an internal combustion engine in order to detect exhaust gas temperature. The device includes an oxygen sensor which has a sense element outboard of a heater element. The oxygen sensor is further designed to incorporate a temperature sensing element on the outboard of the sense element. The temperature sensing element optimizes the detection of the exhaust gas temperature, thereby providing efficient operation of the engine.

19 Claims, 1 Drawing Sheet

EXHAUST GAS TEMPERATURE SENSING ON THE OUTSIDE SURFACE OF THE OXYGEN SENSOR

FIELD OF THE INVENTION

The present invention relates generally to a device for detecting the exhaust gas temperature of an internal combustion engine, and more particularly to an oxygen sensor located within the exhaust system which has an exhaust gas temperature sensing element deposited on the outside surface of the oxygen sensor.

BACKGROUND

In order to reduce the environmental damage that occurs due to the amount of emissions produced by automobiles, there have been strong legislative movements to require automobile producers to effectively monitor the performance of their engines. Although the monitoring and reduction of automotive emissions is a primary concern, so is the performance of the engine. With the intention of achieving optimal engine performance, a variety of approaches have been taken by automobile manufacturers in the attempt to maximize the efficiency of an engine, while producing as few emissions as possible.

One type of exhaust monitoring system incorporates an oxygen sensor. The oxygen sensor is located within the exhaust system of an automobile and is designed to detect an air/fuel ratio which is critical in the performance of a combustion engine. A specific mixture of air and fuel, otherwise known as the "perfect ratio", is required to have the most favorable performance from an engine, while reducing the amount of pollutants produced.

If there is less air than the perfect ratio, fuel will be left over after combustion, resulting in what is known as a rich mixture. A rich mixture results in increased pollution due to the unburned fuel that is left following combustion. In contrast to the rich mixture, a lean mixture is obtained when there is an excess of oxygen in the air/fuel mixture. A lean mixture tends to produce more nitrogen oxide pollutants, resulting in poor engine performance and may ultimately cause damage to the engine.

In addition to monitoring the amount of oxygen present in the exhaust system, the temperature of the exhaust system must also be monitored in order to optimize engine performance. The overheating of the catalytic converter results in an increase in temperature of the exhaust gas system. This temperature increase in the exhaust gas system increases the amount of pollutants which are emitted into the environment.

With the purpose of monitoring the temperature of the exhaust system, different approaches have been taken to incorporate a temperature sensing element within the exhaust system. For example, temperature sensors have been placed as a discrete component within the exhaust system. However, this approach has certain drawbacks due to increased costs and the potential of breaking.

In order to overcome this drawback, another prior art approach incorporates a temperature sensing element within the oxygen sensor. In this approach, a temperature sensing element is printed on the heater element of the oxygen sensor. Although this approach is more popular than a separate temperature sensor, there are problems associated with it as well. For example, the existing heater element within the oxygen sensor is insulated from fluctuations in the exhaust gas temperature by the oxygen sensor's $O_2$ sensing element. Therefore, inaccurate readings are obtained from the temperature sensing element due to its location on the heater element. A time delay results from the exhaust gas passing over the oxygen sensor onto the heating element, wherein the prior art exhaust gas temperature sensing element is located. Therefore any response by the electronic control unit is outdated, due to the delay in time.

SUMMARY OF THE INVENTION

The present invention incorporates the use of a temperature sensing element with an oxygen sensor, but alters the placement of the temperature sensing element on the oxygen sensor. The change in location of the temperature sensing element allows for real-time feedback which can be useful in determining temperature conditions in the exhaust environment. This may include detecting misfires, changes in catalyst temperatures, as well as conditions during wide-open-throttle closed loop control.

More specifically, one object of the present invention is to incorporate a temperature sensing element on the outside of the oxygen sensor's sense element, which results in maximizing the reading capability of the temperature sensing element. The present invention thereby overcomes the problems associated with the prior art, and optimizes the amount of real-time feedback obtained from the temperature sensing element.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
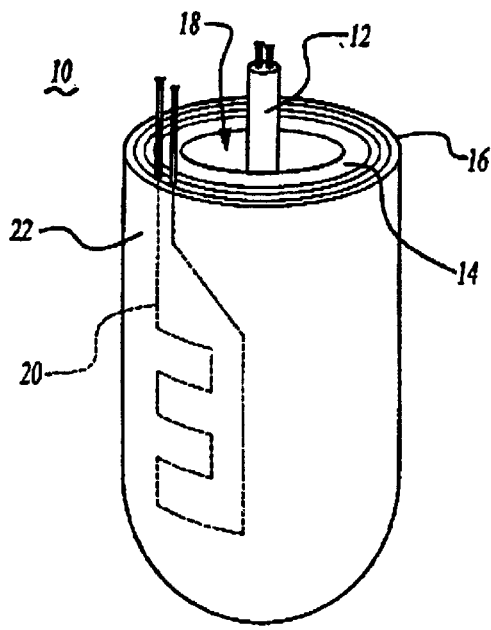
FIG. 1 is a perspective view of a first embodiment oxygen sensor incorporating the teachings of the present invention.

Referring first to FIG. 1, an oxygen sensor 10 having a heater element 12 and a sense element 14 is illustrated. The particular embodiment of the oxygen sensor 10 in FIG. 1 has a cylindrical, cup-shaped outer shell 16 including an elongated, cylindrical internal bore or cavity 18 formed therein. The oxygen sensor 10 is primarily comprised of ceramic, although additional materials and components may by added, as is known in the art.

The outer shell 16 of the oxygen sensor 10 houses the heater element 12 generally within the internal cavity 18. The outer shell 16 is formed of materials including some that, as described below, form the sense element 14. The sense element 14 is located adjacent to the heater element 12. That is, the interior side of the sense element 14 (i.e., the inboard surface of the sense element 14 adjacent the internal cavity 18) is disposed adjacent the outboard or exterior side of the heater element 12. The sense element 14 includes zirconia oxide which reacts with oxygen and works in conjunction with the remaining components of the oxygen sensor 10 to send feedback to an electronic control unit (not shown).

As stated previously, the temperature sensing element 20 is deposited on the outboard or exterior surface of the sense element 14 of the oxygen sensor 10. The temperature sensing element 20 preferably comprises a resistive circuit. The circuit 20 is designed to have fluctuating resistance, dependent upon the temperature of its surroundings, in this case, the exhaust gas.

The function of the resistive circuit 20 is to allow the electronic control unit to monitor the resistance of the circuit 20 as it changes with the temperature of the exhaust gas in a real time manner. This real time manner is made possible due to the present invention's placement of the resistive circuit 20 on the exterior surface of the sense element 14. In particular, the resistive circuit 20 is spaced apart from the heater element 12 by (at least) the sense element 14.

Figure 2:
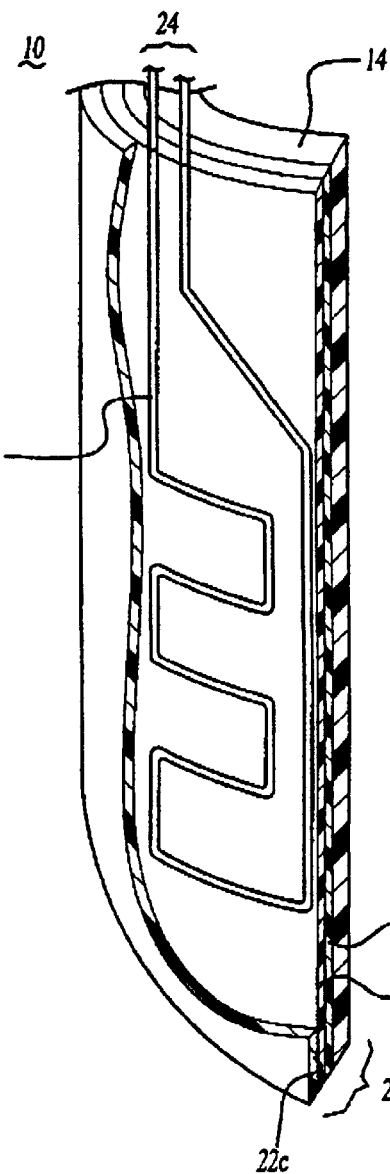
FIG. 2 is a partially cut-away, perspective view of the oxygen sensor of FIG. 1.

With particular reference to FIG. 2, another view of the sense element 14, as well as additional exterior components of the oxygen sensor 10, are illustrated. A plurality of laminated protective coatings 22 are located adjacent to the sense element 14. The protective coatings 22 are applied to the outboard or exterior surface of the sense element 14 in order to isolate the resistive circuit 20 from the sense element 14 and heater element 20 (FIG. 1). By isolating the resistive circuit 20, an accurate temperature reading may be obtained and the resistive circuit 20 is protected from most types of potential damage.

As shown in FIG. 2, two protective coating layers 22*a* and 22*b* are interposed between the sense element 14 and the resistive circuit 20. The application of the protective layers 22 is not limited to this specific quantity and may vary according to the design of the oxygen sensor 10 or its particular application. A particular type of protective layer is preferably categorized as a spinel coating. The spinel coatings 22 are applied by a plasma spray technique. A ceramic material is preferably used as the basis for the composition of the layer 22, although under application conditions this ceramic material is transformed in a glass-like material, in both appearance and performance.

The resistive circuit 20 is deposited on the outboard of the sense element 14, following the initial application of protective layers 22. The application of resistive circuit 20 is preferably accomplished by printing a resistive ink on exterior surface of the sense element 14 or protective layer 22. The resistive ink is preferably applied in the form of a zigzag pattern. Following the printing of the resistive circuit 20, an additional protective coating 22*c* is applied, using the same techniques as described previously. That is, the protective layer 22*c* is disposed over the resistive circuit 20 so as to sandwich it between the protective layer 22*c* and the protective layer 22*b*.

In addition to the protective layers 22, feedback circuitry 24 is incorporated within the oxygen sensor 10 to communicate with the electronic control unit. Electronic leads 24 from the resistive circuit 20 run up the sense element 14 and terminate within the interior of the sensor 10. Furthermore, multiple wires (not shown) minimum one, possibly two, are added to the sensor (10) to transport the circuit signal from the leads 24 to the electronic control unit.

Figure 3:
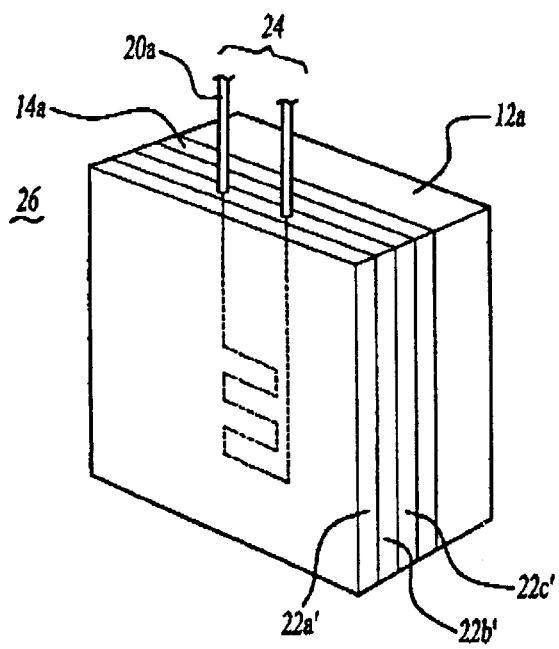
FIG. 3 is a perspective view of a second embodiment oxygen sensor incorporating the teachings of the present invention.

An alternate embodiment of the present invention is illustrated in FIG. 3. A planar sensor 26, which has the same integral features as described previously in the first sensor embodiment, is an alternative design of the oxygen sensor 10. The planar sensor 26 resembles the configuration of an IC chip, wherein the respective layers are built upon one another. As in the previous embodiment of the sensor, the planar sensor 26 includes a heater element 12*a*, a sense element 14*a* adjacent the heater element 12*a* and a resistive circuit 20*a* printed on the exterior surface of the sense element 14*a* opposite the heater element 12*a*. As with the first embodiment, the resistive circuit 20*a* is preferably sandwiched between two protective layers 22*b* and 22*c* outboard of the sense element 14*a*. The main difference between the two embodiments is not in the components or in the functional capabilities, but in the manufacturing methods.

An additional feature of the present invention is the ability of the oxygen sensor 10 to be integrated with Daimler-Chrysler's Next Generation Controller (NGC) in contrast to the Electronic Control Unit (ECU). The development of the NGC has resulted in a further integrated and highly responsive control unit. More specifically, by designing the oxygen sensor 10 to have the capacity to be applied with the NGC, the temperature of exhaust gas will be monitored and controlled to specific temperature levels and controller response times.

In general, the above disclosed invention provides an increase capability and more accurate means to monitoring the exhaust temperature system of an automobile. The integration of the resistive circuit 20 on the exterior surface of the sense element 14, will provide additional information regarding temperature regulation within an internal combustion engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. An oxygen sensor for sensing the temperature and oxygen level of exhaust gas in an exhaust system of an internal combustion engine, said oxygen sensor comprising:
   a sense element for sensing oxygen level
   a heater element for heating the sense element;
   a temperature sensing element for sensing the exhaust gas temperature, said temperature sensing element being in spaced relationship with said heater element; and
   said sense element being disposed outside of said heater element and inside of said temperature sensing element.

2. The oxygen sensor according to claim 1 wherein said temperature sensing element is a resistive circuit.

3. The oxygen sensor according to claim 2 wherein said resistive circuit is disposed on an exterior surface of the sense element of said oxygen sensor.

4. The device according to claim 2 wherein said resistive circuit is printed on an exterior surface of the sense element.

5. The device according to claim 4 wherein said resistive circuit is printed on said sense element in a zigzag pattern.

6. The oxygen sensor according to claim 1 further comprising at least one protective coating disposed between said sense element and said temperature sensing element.

7. The oxygen sensor according to claim 1 wherein the sense element includes a central bore wherein the heater element is disposed.

8. The oxygen sensor according to claim 1 wherein said sense element comprises zirconia oxide.

9. An apparatus for detecting exhaust gas temperature and oxygen level from an internal combustion engine, said apparatus comprising:

an oxygen sensor disposed downstream of the internal combustion engine;

an electronic control unit communicating with said oxygen sensor;

a resistive circuit disposed on an exterior surface of said oxygen sensor;

sense element including an internal cavity, said resistive circuit disposed on a surface of the sense element opposite the internal cavity; and a heater element disposed on said internal cavity.

10. The apparatus according to claim 9 wherein said resistive circuit is printed on an exterior surface of the sense element of said oxygen sensor.

11. The apparatus according to claim 9 further comprising at least one protective coating disposed between said resistive circuit and the sense element of said oxygen sensor.

12. The apparatus according to claim 11 further comprising another protective coating disposed outboard of said resistive circuit.

13. The apparatus according to claim 11 wherein the protective coating is a spinel coating.

14. An oxygen sensor adopted for use in an exhaust system of an internal combustion engine in order to detect exhaust gas temperature and oxygen concentration, said oxygen sensor comprising:

a cylindrical shell with a central cavity formed therein;

a heater element disposed within said cavity;

a sense element formed within said shell;

at least one protective coating formed within said shell and outside of said sense element and said heater element; and a resistive circuit disposed on an exterior surface of said protective coating.

15. The oxygen sensor according to claim 14 further comprising another protective coating disposed outside of said resistive circuit.

16. The oxygen sensor according to claim 14 further comprising feedback circuitry interconnecting said resistive circuit and a controller.

17. The oxygen sensor according to claim 14 wherein said resistive circuit is printed on the exterior surface of the protective coating.

18. The oxygen sensor according to claim 17 wherein the protective coating is a spinel coating.

19. The oxygen sensor according to claim 18 wherein said spinel coating is applied by a plasma spray.

\* \* \* \* \*